[72] Inventors Noel B. Proctor;
William T. Walters, both of Houston, Tex.
[21] Appl. No. 863,568
[22] Filed Oct. 3, 1969
[45] Patented June 15, 1971
[73] Assignee AMF Incorporated
New York, N.Y.

[54] ULTRASONIC INSPECTION APPARATUS AND METHOD FOR NONDESTRUCTIVE TESTING OF TUBULAR MEMBER HAVING VARYING INNER DIAMETER
18 Claims, 5 Drawing Figs.

[52] U.S. Cl................ 73/67.8,
73/67.9, 73/71.5
[51] Int. Cl................ G01n 29/04
[50] Field of Search............... 73/67.7,
67.9, 71.5

[11] 3,584,504

[56] References Cited
UNITED STATES PATENTS

| | | | |
|---|---|---|---|
| 3,121,324 | 2/1964 | Cowan | 73/67.8 X |
| 3,508,436 | 4/1970 | Krautkramer | 73/71.5 X |

FOREIGN PATENTS

| | | | |
|---|---|---|---|
| 540,371 | 4/1957 | Canada | 73/71.5 |

*Primary Examiner*—Richard C. Queisser
*Assistant Examiner*—John P. Beauchamp
*Attorneys*—George W. Price and John H. Gallagher ABSTRACT: The invention is particularly useful for ultrasonic inspection of tubular goods having upset ends, i.e., end regions which have been worked during manufacture to produce wall thicknesses which are greater than in the remaining portions of the members, the upset ends having tapering inner and/or outer surfaces over a portion of their thickened regions.

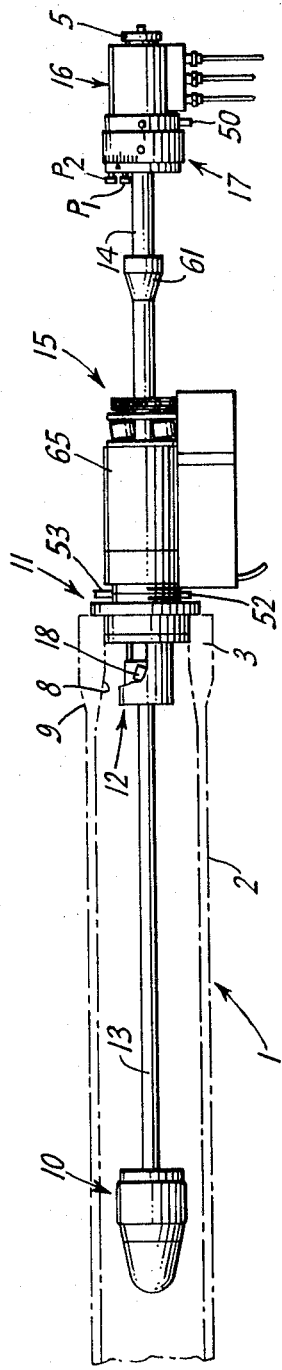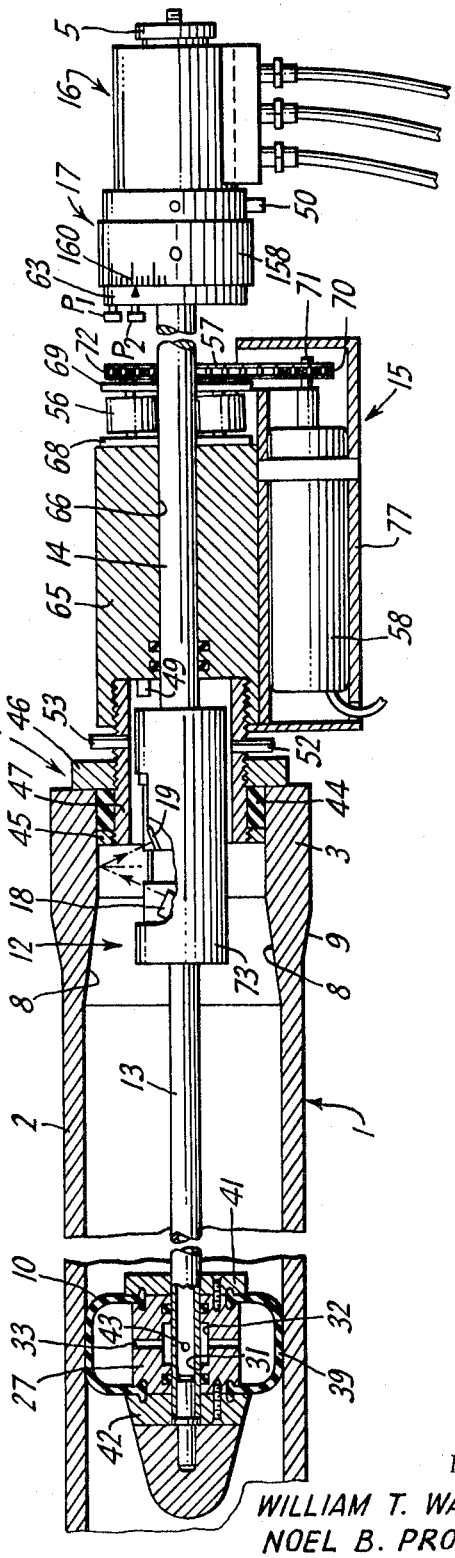
FIG. 1
FIG. 2
INVENTOR
WILLIAM T. WALTERS
NOEL B. PROCTOR
BY John H. Gallagher
ATTORNEY

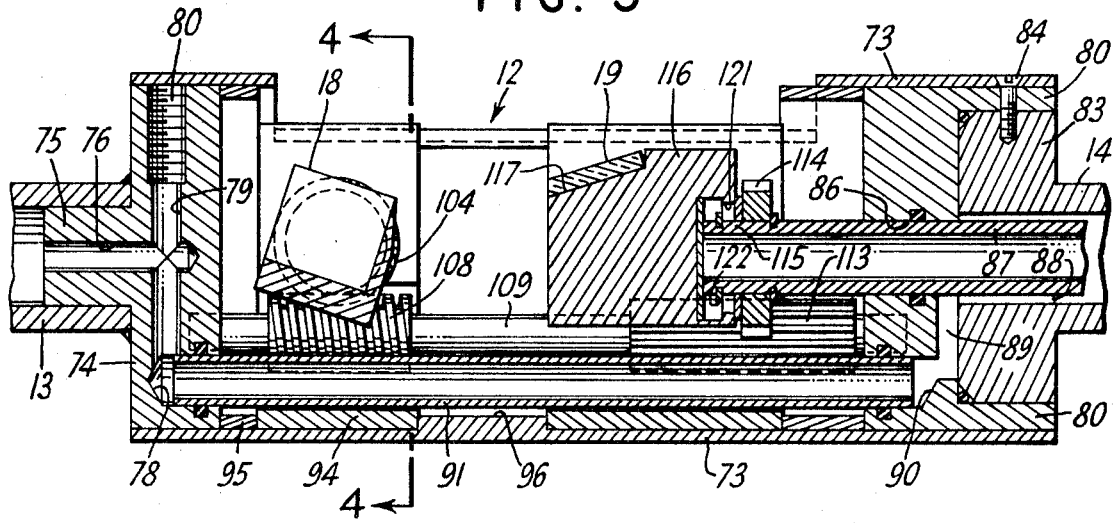
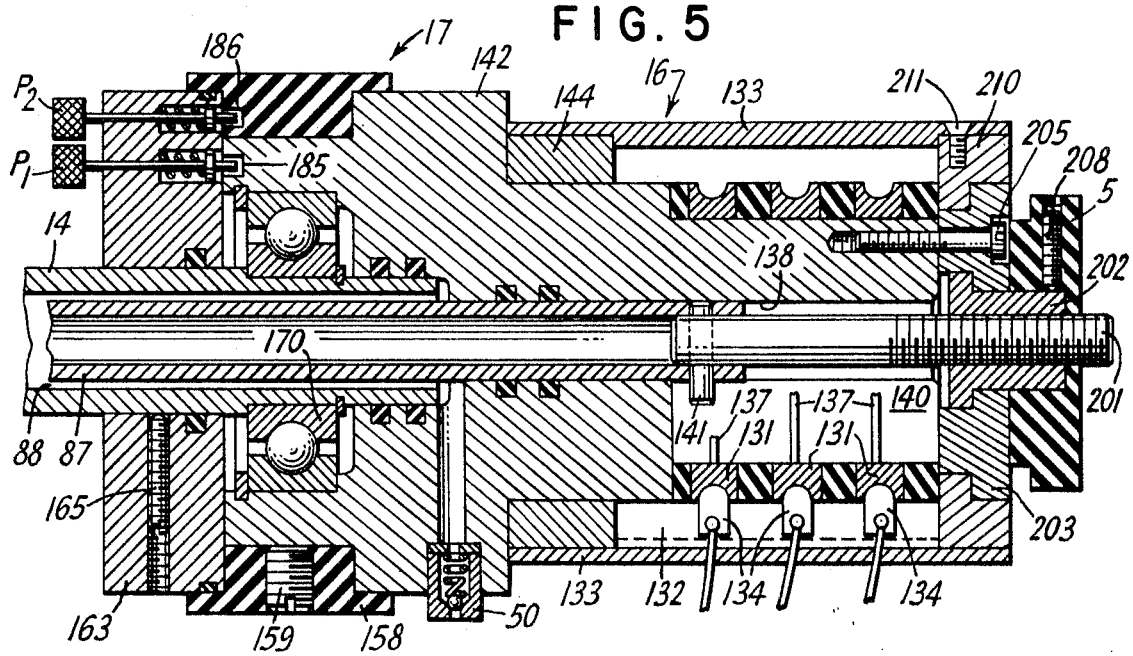
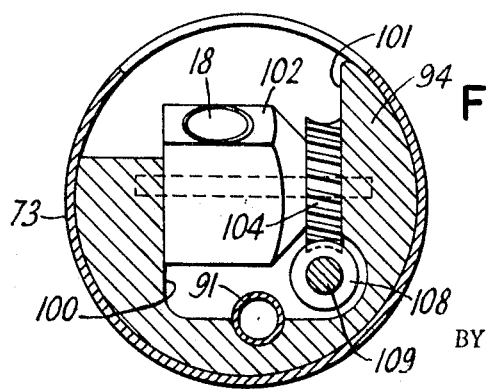

ULTRASONIC INSPECTION APPARATUS AND METHOD FOR NONDESTRUCTIVE TESTING OF TUBULAR MEMBER HAVING VARYING INNER DIAMETER

BACKGROUND OF THE INVENTION

Anomalies, or flaws, that commonly occur in the upset ends of pipes often extend normally to the surface of the pipe and sometimes are not easily detected with ultrasonic energy propagating as longitudinal waves that are directed into the member normally to its surface. It has been found that better inspection results are obtained when the ultrasonic energy propagates in the member as shear waves.

In coupling the ultrasonic waves into a metallic member, a liquid-coupling medium such as water ordinarily is used. Because water is a nonelastic medium shear waves cannot propagate through it. Therefore, it is necessary to first generate longitudinal waves and allow them to propagate through the coupling medium and come into contact with the metallic pipe. As is well known, the propagating mode of the ultrasonic waves may be converted from longitudinal waves in the water-coupling medium to shear waves in the metallic pipe by directing the longitudinal waves onto the surface of the pipe at an angle other than normal to the surface. The amount of mode conversion experienced is a function of the angle of incidence, and at a certain angle called the critical angle, optimum mode conversion occurs. Because the ultrasonic waves are incident at the water-metallic interface at an angle other than normal, reflections of the incident waves from that interface will not return along the same propagating path and will not return to the transmitting transducer. In accordance with one aspect of this invention, the inspection apparatus includes a second receiving transducer that is positioned to receive reflections from the transverse waves so that a timing sequence in electronic flaw-detecting circuitry may be commenced to provide a measure of the location of anomalies within the wall of the pipe.

On the other hand, the ultrasonic energy propagating as shear waves within the wall of the pipe will be reflected from an anomaly in the pipe wall and will return substantially along the same path back to the transmitting transducer, and when incident thereon, will generate a flaw signal which may be utilized to produce a desired readout signal which indicates the location of the anomaly.

When inspecting the upset end of a pipe where the inner surface of the pipe is tapered as the inner diameter changes, the transmitted ultrasonic energy still must be incident on the inner surface at the angle that will produce optimum mode conversion from longitudinal to shear waves. Therefore, in accordance with this invention, means are provided to change the angular orientation of the transmitting transducer when the tapered region is inspected. Also, because of the inclination of the partially reflecting inner surface, the geometry of the propagating path of the front face reflections has changed. To compensate for this, the axial location of the second transducer is adjustable to assure that the front surface reflections are received by the receiving transducer.

BRIEF DESCRIPTION OF THE DRAWINGS

FIG. 1 is a simplified illustration of the ultrasonic inspection apparatus of this invention inserted within the upset end of pipe which is to be inspected;

FIG. 2 is a sectional view showing in detail the inflatable sealing means at the left end of the apparatus, and the details of the motor drive system that imparts a helical scanning motion to the inspection apparatus;

FIGS. 3 and 4 are detail views of the transducer carrier that houses the two ultrasonic transducers; and, FIG. 5 is a cross-sectional view of the mechanisms for adjusting the angular orientation and axial location of the respective ultrasonic transducers.

DESCRIPTION OF PREFERRED EMBODIMENT

Referring in detail to FIGS. 1 and 2, the pipe 1 to be inspected for anomalies in its upset end region 3 is suitably supported in a horizontal position. The main body portion 2 of the pipe is of uniform wall thickness, and the end portion 3 is of greater uniform thickness. The pipe wall tapers in thickness between the main portion 2 and end portion 3 so that the inner and outer surfaces at the regions 8 and 9 are inclined to the axis of the pipe.

The inspection apparatus of this invention includes an expandable seal assembly 10 located at the left end of the apparatus, and a second seal assembly 11 positioned within the end 3 of the pipe. Seal assembly 10 is inflatable in character, and is illustrated in its deflated condition in FIG. 1 and in its inflated condition in FIG. 2. Translatable with respect to seals 10 and 11, when the seals are properly set, are a transducer carrier 12 and shafts 13 and 14. A drive system 15 for helically translating the shafts 13, 14 and transducer carrier 12, is fixed with respect to the end 3 of pipe 1. Shaft 14 passes axially through the drive system 15. A transducer adjustment assembly 16 and a transducer angle adjustment means 17 are located at the right end of shaft 14. Assembly 16 also includes electrical slip rings for establishing connections between internal and external flaw signal circuitry.

As seen in FIG. 2, transducer carrier 12 supports a transceiving transducer 18 and a receiving transducer 19. The angle adjustment means 17 is part of a mechanism to change the angle of transceiving transducer 18 relative to the inner surface of the pipe. The knob 5 at the extreme right end of assembly 16 is part of a mechanism which permits the position of receiving transducer 19 to be moved axially with respect to transceiving transducer 18.

Expandable seal assembly 10 is comprised of an annular body member 27, FIG. 2, having a central bore 31 through which shaft 13 may pass with a helical motion. A recess 32 is machined in the surface of bore 31 and radial ports 33 extend from recess 32 through body member 27 and communicate with the interior of an annular sleeve 39 which is made of a flexible fluidtight material which may be elastomeric in character. The inner ends of sleeve 39 have ribs thereon which are held in a fluidtight manner between circular slots in body member 27 and similar circular slots in end members 41 and 42.

In the relative locations of the parts as illustrated in FIG. 2, an aperture 43 in hollow shaft 13 communicates with the recess 32 in the central bore of body member 27 and provides means for transmitting a fluid, such as air, from hollow shaft 13 to the interior of sleeve 39 to inflate it and bring it into sealing engagement with the inner wall of pipe 1.

As illustrated in FIG. 2, O-rings are provided to establish a fluid seal between body member 27 and the translatable shaft 13. O-rings and fluid seals are illustrated elsewhere in the drawings, but for sake of brevity, they will not be specifically described since their arrangements and functions are well understood by those skilled in the art.

In order to convey an initial understanding of the use of the apparatus of this invention and of the relationship of the various parts, a brief general description of the operation of the apparatus of FIGS. 1 and 2 now will be presented. A detailed description of the component portions of the apparatus then will follow.

The apparatus illustrated in FIG. 1, exclusive of the pipe, is lightweight and is easily handled by one operator. The operator inserts the left end of the apparatus within pipe 1 so that transducer carrier 12 is in the upset end region 3 of the pipe when the seal 11 is within the right end of the pipe. The seal 11 comprises a washer or packer 44, FIG. 2, of an elastomeric material which is held on its left side by a retaining ring 45. A ring nut 46 is threadably engaged on a sleeve 47 and is turned so that to move it to the left to axially compress washer 44, thereby radially expanding the washer and bringing it into sealing engagement between the inner wall of pipe 1 and sleeve 47.

With the right end of the pipe now sealed, air under pressure is pumped in through a port 50 located adjacent adjustment assembly 16 at the right end of the apparatus. Port 50 communicates with an internal passageway that extends through angular adjustment means 17, shaft 14, transducer carrier 12, and hollow shaft 13. As previously explained, the air under pressure then passes through aperture 43 and into the interior of the sleeve or tube 39 so as to inflate the sleeve to provide a fluidtight seal at the left end of the apparatus.

An ultrasonic coupling fluid such as water next is introduced into an input port 52 which passes through sleeve 47. Sufficient clearance is provided between transducer carrier 12 and the inner surface of sleeve 47 to permit the fluid to enter the interior of pipe 1 and to fill the region between the fluidtight seals 10 and 11. An output port 53 is provided diametrically opposite the input port 52 to bleed off air and liquid to assure that the interior region of the pipe is completely filled with the coupling fluid. The fluid may be continuously circulated in the manner described throughout the entire inspection operation.

The ultrasonic inspection circuitry next is energized so that it may perform its desired inspection function, as will be described in more detail below. Drive system 15 is actuated so as to rotate drive rollers 56. Drive rollers 56 are mounted circumferentially around shaft 14 with their axes of revolution slightly skewed with respect to the central axis of shaft 14 so that when the rollers are rotated by means of chain drive 57 and motor 58, they impart a rotary and an axial motion to shaft 14, thereby causing shaft 14, transducer carrier 12, and shaft 13 to move helically about the central axis of pipe 1. Drive rollers 56 first are driven in a direction so as to cause transducer carrier 12 to move toward the left as it follows its helical path within pipe 1. During its helical movement toward the left, the ultrasonic inspection apparatus, which includes transducers 18 and 19, completely scans the interior horizontal surface of pipe 1 and causes ultrasonic energy to be directed into the pipe to detect anomalies within the wall of the pipe. The angle of transceiving transducer 18 initially is set so that the ultrasonic energy propagating through the coupling medium is incident on the inner horizontal surface of pipe 1 at an angle of approximately 18½°. Energy transmitted from transceiving transducer 18 initially must propagate as longitudinal waves inasmuch as the coupling fluid, such as water, is a nonelastic medium and will not support shear waves. It is desired that the ultrasonic energy propagate within the wall of pipe 1 as shear waves in order to achieve the desired inspection results, as mentioned above. By assuring that the ultrasonic energy is incident at the inner surface of pipe 1 at an angle of approximately 18½°, optimum mode conversion will be achieved. This angle of incidence of 18½° is a function of a number of quantities, as is well known, and has been found to be approximately optimum when water is used as a coupling medium and the pipe is a steel pipe of a grade commonly used in oil field operations.

Transducer carrier 12 continues its helical travel to the left and inspection data is obtained for the portion of the pipe having an inner surface approximately parallel to the central axis of the pipe 1. A limit stop ferrule 61, FIG. 1, is secured to shaft 14 and also moves to the left as transducer carrier 12 and shaft 14 follow their helical scan to the left. A limit stop switch (not illustrated) is located in the drive system 15 and is tripped by limit stop ferrule 61 after transducer carrier 12 reaches a predetermined position within pipe 1. Limit stop ferrule 61 is adjustable in position along shaft 14 so that any desired length of pipe 1 may be inspected. Approximately 14 inches of the end region of the pipe usually are inspected inasmuch as it is this length of the end region that is most likely to have flaws therein as a result of the upset-forming operation.

Means are provided for reversing the direction of the drive rollers 56 so that transducer carrier 12, and shafts 13 and 14 then are rotated in an opposite helical direction toward the right. Prior to this traversal of direction of transducer carrier 12, the angle of the transceiving transducer 18 is adjusted so that ultrasonic energy transmitted therefrom now will be incident on the inclined surface 8 at the upset region at the desired angle of 18½°. This adjustment in the angular orientation of transceiving transducer 18 is accomplished by means of the angular adjustment mechanism 17 which has a rotatable barrel 158 which connects with a control shaft that extends within hollow shaft 14. The control shaft engages the crystal holder of transceiving transducer 18 so as to change the angular orientation of that transducer as a function of the rotation of barrel 158.

Because the geometry of the propagating path of ultrasonic energy reflected from the inner surface of pipe 1 will be different when the energy is reflected from the inclined surface 8, the axial position of transceiving transducer 19 may be changed so as to optimally receive that reflected energy. This axial adjustment is made by turning the adjustment knob 5 at the extreme right end of adjustment assembly 16.

With the orientation and location of the transducers 18 and 19 now properly set to inspect the region having the inclined surface, drive rollers 56 are actuated by drive system 15 to move transducer carrier 12 toward the right whereby the inspection process may be performed on the region of the inclined surface 8.

A second limit switch 49 is located within the right end of sleeve 47 and is actuated by transducer carrier 12 as it reaches the desired limit of its movement to the right. Motor drive means 15 is stopped by the actuation of limit switch 49 and the inspection operation is terminated.

The reflections of ultrasonic energy from the inner surface of the pipe which are received by the receiving transducer 19 actuate gating means in the ultrasonic flaw signal circuitry to permit the circuitry to produce an output signal only upon detection of a flaw or anomaly within the wall of pipe 2. The actual flaw signal is produced by transceiving transducer 18 in response to reflections of ultrasonic energy from the flaw within the wall of the pipe. Various arrangements of electronic circuitry may be employed in the flaw detection circuitry, but none will be described herein since the circuitry is not part of the present invention.

Upon completion of the inspection of a section of pipe, the coupling fluid such as water is pumped out of the interior region of the pipe, seal assembly 10 is deflated, seal assembly 11 is disengaged from within the end of pipe 1, and the inspection assembly is withdrawn from the pipe. The apparatus is now ready to begin inspection of another section of pipe.

DRIVE ASSEMBLY 15

As previously mentioned, drive assembly 15 is supported in fixed relationship with respect to the upset end 3 of pipe 1. Referring to FIG. 2, the drive assembly is comprised of an annular support block 65 which threadably engages the right end of sleeve 47. The internal bore 66 of support block 65 provides a bearing surface to permit the helical translation of shaft 14 therethrough.

An annular flange 68 is secured to the right end of support block 65, and together with a second annular flange 69 which is bolted in spaced relationship to flange 68, support three driven rollers 56. Rollers 56 are disposed circumferentially about shaft 14 in contact with its outer surface. The axles that support rollers 56 are slightly skewed with respect to the axis of shaft 14 so that when the rollers all are driven in the same direction they impart a helical motion to shaft 14. Spur gears 72 are connected to the right ends of the roller axles and a chain 57 engages those gears as well as a gear 70 connected to drive shaft 71 of a variable speed, reversible motor 72. Motor 58 is supported on support block 65 in a fixed position by a suitable bracket assembly 77, as illustrated. The rotation of motor drive shaft 71 in one direction causes shafts 13, 14 and transducer carrier 12 to move with a helical motion in one axial direction, to the left, for example, and rotation of motor drive shaft 71 in the opposite direction causes shafts 13, 14 and transducer carrier 12 to move helically in the opposite axial direction.

TRANSDUCER CARRIER 12 AND TRANSDUCER 18 ANGLE ADJUSTMENT

As illustrated in FIGS. 2 and 3, transducer carrier 12 is comprised of an outer cylindrical sleeve 73 that has a portion of its cylindrical surface cut away, the cutout being shown at the top of sleeve 73 of both figures.

A disc-shaped member 74 is disposed in sealed relationship with the left end of cylindrical sleeve 73. Disc 74 has a short stub 75 extending outwardly from its left surface and hollow shaft 13 fits over the stub 75 and is secured to disc 74 by a fillet weld. An axial bore 76 extends through stub 75 and communicates with a bore 79 that extends transversely through disc 74. The top end of bore 79 is plugged by means of a screw 80, and the bottom end of bore 79 communicates with a blind bore 78 that extends through to the right surface of disc 74. A fluid passageway thus is provided through disc 74 to the interior of hollow shaft 13.

The right end of cylindrical sleeve 73 is closed by an annular member 80 which is adapted to receive the enlarged end 83 of the hollow shaft 14. Screw 84 secures together shaft 14, annular member 80 and cylindrical sleeve 73. Therefore, the helical movement of shaft 14 will carry with it transducer carrier 12 and shaft 13 so that all will move as a rigid unit.

Annular member 80 has a central bore 86 therein which receives the adjusting tube 87 that extends coaxially through hollow shaft 14. It may be seen that there is a clearance space 88 between the inner surface of hollow shaft 14 and the outer surface of adjusting tube 87. A slot 89 is provided between the bottom right face of annular member 80 and the enlarged end 83 of shaft 14, this slot being in communication with the clearance space 88. A bore 90 extends through the left bottom portion of annular member 80 and communicates with the slot 89 previously described. Tube 91 extends longitudinally between the bore 90, just described, and the blind bore 78 in disc 74 at the left end of transducer carrier 12. It is evident from the arrangement just described that a fluid passageway extends from the interior of shaft 14 at the right end of transducer carrier 12 completely through to the interior of shaft 13 at the left end of the carrier 12. As will become evident from the description below, it is through this fluid passageway that air under pressure is passed to inflate the inflatable seal assembly 10.

Within the left half of transducer carrier 12 is a transducer support shell 94 which is in fixed contact with the inner surface of cylindrical sleeve 73. Support shell 94 is axially fixed between an annular spacing shim 95 on its left and a shoulder of a radially thickened portion 96 of cylindrical sleeve 73 on its right. As seen in FIG. 4, support shell 94 is somewhat U-shaped in cross-sectional configuration and rotatably supports between the parallel vertical faces 100 and 101 the mounting block 102 in which is mounted transceiving transducer 18. Spur gear 104 is fixed to the right end of mounting block 102 so that both will rotate together. The bottom portion of support shell 94 is recessed to receive the longitudinally extending tube 91. A worm gear 108 is disposed within the U-shaped portion of support shell 94 and meshes with spur gear 104. As seen in FIG. 3, worm gear 108 is fixed to a rotatable shaft 109 whose left end is journaled in end disc 74 and whose right end is journaled in the bottom portion of annular member 80. An elongated gear 113 is secured to shaft 109 near its right end and is in engagement with a gear 114 which is fixed to the left end of the adjusting tube 87 that extends axially to the right within shaft 14. Thus, the rotation of adjusting tube 87 rotates gears 114 and 113, shaft 109 and worm gear 108. Rotation of worm gear 108 turns spur gear 104 and transducer mounting block 102 to thereby change the angular orientation of transceiving transducer 18 relative to the inner surface of pipe 1.

The left end 115 of adjusting tube 87 is attached to a receiving transducer mounting block 116 by suitable connector means, such as a bayonet connector 121, 122, which holds the two in fixed axial relationship, but permits rotational motion of adjusting tube 87 relative to the nonrotatable mounting block 116. Receiving ultrasonic transducer 19 is fixedly mounted on inclined surface 117 of mounting block 116, and mounting block 116 is supported within cylindrical sleeve 73 in a manner to permit its axial location, and thus the axial location of receiving transducer 19, to be moved closer or farther away from transceiving transducer 18. The axial position of mounting block 116 is adjusted by the axial movement of adjusting tube 87.

ADJUSTMENT ASSEMBLY FOR TRANSDUCERS 18 AND 19

As illustrated in FIGS. 2, 3, and 5, hollow shaft 14 and the coaxially disposed adjusting tube 87 extend toward the right from transducer carrier 12 and connect to the transducer adjustment assembly 16. As mentioned previously, adjustment assembly 16 includes an angle adjustment means 17 for accurately setting the angular position of transceiving transducer 18, and also includes a mechanism for adjusting the axial position of receiving transducer 19 relative to transducer 18. Further, the assembly 16 includes an electrical slip ring arrangement which now will be described.

Two electrical connections must be provided to transceiving transducer 18, one for coupling transmitter pulses thereto and the other being a ground connection. A third connection must be established to receiving transducer 19. Transducers 18 and 19 share a common ground connection.

Referring in detail to FIG. 5, slip rings 131, separated by insulating spacers, are mounted on the right end of a cylindrical body member 142. A bar of insulating material 132 is fixed to outer cylindrical sleeve 133 and supports connecting terminals from which the flexible conductive brushes 134 extend to respective slip rings 131. A radial slot 140, shown in the lower right end of cylindrical body member 142, permits the wires 137 to extend from slip rings 131 through the interior of the apparatus to transducers 18 and 19.

Considering now the mechanism for adjusting the angular orientation of transceiving transducer 18, it is seen that the coaxially disposed adjusting tube 87 extends within the central bore 138 of cylindrical body member 142. Adjusting tube 87 is axially translatable within bore 138 but is restrained against rotary motion relative to member 142 by a pin 141 which extends transversely through the right end of tube 87 and is held within the narrow radial slot 140, thereby preventing pin 141 and tube 87 from rotating relative to cylindrical body member 142. Recalling the description of FIG. 3, it will be remembered that the rotation of adjusting tube 87 ultimately results in the change of angular orientation of transducer 18 via gears 113, 114, rod 109, worm gear 108, and spur gear 104. Therefore, rotation of cylindrical body member 142 will accomplish the desired angular movement of transducer 18. Cylindrical body member 142 is rotatable with respect to shaft 14 on the left by means of a ball bearing 170, and is rotatable with respect to outer sleeve 133 on the right of FIG. 5 by means of suitable bearings 144.

The outer left end of body member 142 has a portion of reduced diameter on which is mounted an index ring 158 that is releasably secured to body member 142 by a setscrew 159. As illustrated in FIG. 2, index ring 158 has a scale 160 on its top surface, which in cooperation with a reference mark on the adjacent clamp plate 163, provides means for precisely adjusting the angular orientation of transceiving transducer 18. As seen in FIG. 5, clamp plate 163 is releasably secured to shaft 14 by means such as setscrew 165. Once the desired angular orientation of transceiving transducer 18 is set, cylindrical body member 142 and index ring 158 are fixed against rotation by means of spring-loaded plungers $P_1$ and $P_2$ which are held in clamp plate 163 and whose right ends may fit within holes 185 and 186 in cylindrical body member 142 and index ring 158.

The procedure for setting the angular orientation of transceiving transducer 18 to inspect the region 2 of pipe 1, FIG. 1, wherein the inner surface of pipe 2 is substantially uniformly parallel to the axis of the pipe, and for setting a different angular orientation of transducer 18 to inspect the region at the upset end, wherein the inner surface of the pipe is inclined with respect to the axis of the pipe, is as follows. Initially, plungers $P_1$ and $P_2$ are disengaged from cylindrical body member 142 and index ring 158, and setscrew 159 is turned in to secure index ring 158 to cylindrical body member 142. Index ring 158 and cylindrical body member 142 are rotated together, thus rotating adjustment tube 87 to set transceiving transducer 18 at the desired angle that achieves optimum mode conversion of ultrasonic energy into shear waves within the wall 2 of pipe 1.

As previously mentioned, this angle is approximately 18½° for a water-steel interface. After this desired angle has been set, setscrew 165 is turned out to permit clamp ring 163 to rotate about shaft 14. Clamp ring 163 is rotated until its reference mark, FIG. 2, is aligned with the zero index mark of the scale 160 on index ring 158. Setscrew 165 then is turned in to secure clamp ring 163 to shaft 14. At this time, the holes 185 and 186 in cylindrical body member 142 and index ring 158 are radially aligned. In this position, plungers $P_1$ and $P_2$ will engage the respective holes 185 and 186. Assuming that the inclination of the inner surface of the pipe at region 8 is equal to 8° with respect to the central axis of the pipe, it is desired to establish this 8° relationship as a fixed setting in the angle adjustment means 17. This is accomplished by withdrawing plunger $P_2$ from engagement with index ring 158 and then turning out setscrew 159 in index ring 158 and rotating index ring 158 through an opposite angle of 8° relative to cylindrical body member 142. Setscrew 159 then is turned in to again secure index ring 158 to cylindrical body member 142. Plunger $P_1$ then is withdrawn from engagement with cylindrical body member 142 and index ring 158 is turned back through the same 8° until plunger $P_2$ falls within the hole 186 of the index ring. It may be seen that two angular positions are set into the adjustment mechanisms, one position being fixed when plunger $P_1$ is within hole 185 and the other position being when plunger $P_2$ is in hole 186.

The remaining adjustment that is provided by adjustment assembly 16 is the axial positioning of receiving transducer 19. This last adjustment is made by means of mechanism located at the extreme right end of the adjustment assembly 16, FIG. 5, and includes a centrally positioned rod 201 which is disposed within the right end of adjustment tube 87 and is fixed thereto by means of pin 141. The right end of rod 201 is threadably received within bushing 202 which extends through the annular end plate 203. End plate 203 is fixed with respect to cylindrical body member 142 by means of the screw 205, but bushing 202 is rotatable with respect to end plate 203. Adjustment knob 5 is fixed to bushing 202 by means of setscrew 208. A bushing 210 is secured to outer sleeve 113 by a screw 211, and end plate 203 is rotatable within bushing 210. The rotation of knob 5 and bushing 202 imparts solely an axial movement to rod 201 and the adjustment tube 87. Because the left end of adjustment tube 87 is fixed to mounting block 116, FIG. 3, on which transceiving transducer 19 is mounted, it is seen that the rotation of knob 5 causes an axial displacement of receiving transducer 19. The rotation of knob 5 imparts no rotary motion to adjusting tube 87 because pin 141 extends within the radial slot 140 in cylindrical body member 142, and the clearance therebetween is close enough to prevent angular rotation of pin 141. The angular rotation of index ring 158, cylindrical body member 142 and adjusting tube 87 results in no axial translation of rod 201 or adjusting tube 87 because bushing 210 allows the free rotation of end plate 203 relative to bushing 202.

In adjusting the axial location of receiving transducer 19, knob 5 at the right end of adjustment assembly 16 is rotated and the output from receiving transducer 19 is monitored until a maximum amplitude signal is obtained. This then is the desired axial location for receiving transducer 19.

Located at the bottom central region of FIG. 5 is the air valve 50 through which air under pressure is pumped to inflate the inflatable seal 10. It is seen that valve 50 communicates with a bore whose upper end is in communication with the previously described axially extending passageway 88.

From the above description it is evident that the apparatus of this invention affords means for quickly and accurately inspecting the upset end of a tubular member. The inflatable seal assembly 10 permits the inspection apparatus to be easily inserted and withdrawn from the end of the pipe to be inspected, and because the shafts 13 and 14 are translatable with respect to the fixed seals 10 and 11, positive fluidtight seals are easily established even though the pipe may be somewhat out of round. This is a distinct advantage over other arrangements wherein the fluid seals must be translatable along with the inspection apparatus.

Although the apparatus of this invention has been described for use in the inspection of an upset end region of a tubular member, its use is not necessarily so restricted. For example, the apparatus may be used to inspect tubular members of uniform thickness through their entire length, and may be used to inspect a longitudinal weld along a pipe or a girth weld that joins abutting pipes. For other uses of the apparatus it may be desired that motions other than helical be imparted to the transducer carrier 12.

What we claim is:

1. Ultrasonic inspection apparatus for insertion within the end of the tubular member to inspect said member for flaws, comprising
    elongated shaft means adapted to be inserted within a tubular member,
    ultrasonic inspection apparatus carried on the shaft means intermediate the two ends thereof,
    expandable fluidtight sealing means carried on said shaft means on one side of said inspection apparatus,
    a second fluidtight sealing means carried on said shaft means on the side of the inspection apparatus opposite said one side,
    said second fluidtight sealing means being adapted to provide a fixed seal at the end of the tubular member when said expandable sealing means and at least a portion of the shaft means are within said tubular member,
    means for expanding said expandable sealing means when the apparatus is within a tubular member to provide a fixed fluidtight seal within said member,
    said shaft means being axially translatable through said two fixed sealing means,
    means for filling the interior region of the tubular member bounded by said two sealing means with an ultrasonic energy-coupling fluid, and
    means for translating said ultrasonic inspection apparatus through the interior region of said tubular member bounded by said sealing means.

2. Ultrasonic inspection apparatus as claimed in claim 1 wherein,
    said ultrasonic inspection apparatus comprises first and second spaced ultrasonic transducers, and wherein said apparatus further includes
    transducer adjustment means carried on said shaft means and located exterior of the tubular member when said second sealing means is in sealing engagement with the tubular member,
    said transducer adjustment means including means for changing the angular orientation of one of the transducers relative to the central axis of the tubular member and means for changing the spacing between said transducers.

3. Ultrasonic inspection apparatus for insertion within a tubular member to ultrasonically inspect said member, comprising
    an ultrasonic transducer carrier adapted to be inserted within the tubular member, first and second coaxially aligned hollow shafts extending from opposite sides of said transducer carrier, an inflatable sealing means carried on said first shaft and adapted to be inserted within the tubular member in nonsealing relationship therewith, a second fluidtight sealing means carried on said second shaft and adapted to provide a fixed seal at one end of the tubular member when the inflatable sealing means and said transducer carrier are within said tubular member, means for inflating said inflatable sealing means to bring it into contact with the inner surface of the tubular member when the first hollow shaft and the transducer carrier are within the member, thereby to provide a fixed fluidtight seal at an axial location removed from said one end, said transducer carrier being disposed in spaced relationship from the inner surface of the tubular member when said two sealing means are in sealing engagement with the tubular member, means for filling the interior region of the tubular member bounded by the two sealing means with an ultrasonic energy-coupling fluid, and means for translating said transducer carrier through the bounded region of said tubular member.

4. The inspection apparatus claimed in claim 3 wherein the means for inflating said inflatable sealing means comprises a first fluid passageway extending longitudinally through said second hollow shaft, said transducer carrier, and said first hollow shaft, a second fluid passageway extending radially through said first hollow shaft and communicating with said inflatable sealing means to admit fluid under pressure for inflating the sealing means, and fluid connector means communicating with said second hollow shaft at a region thereon exterior to the sealed tubular member and communicating with said first fluid passageway for admitting a fluid under pressure into said passageway for inflating the inflatable sealing means.

5. Ultrasonic inspection apparatus as claimed in claim 4 and including first and second ultrasonic transducers adjustably mounted on said transducer carrier, transducer adjustment means carried on said second hollow shaft on the side of said second sealing means opposite the transducer carrier, said transducer adjustment means including, adjustment mechanism extending through said second hollow shaft and within the transducer carrier and coupled, respectively, to the first and second transducers, said adjustment mechanism being rotatable and axially translatable relative to said second hollow shaft, means in said transducer carrier for rotating the angular orientation of the first transducer relative to the axis of the tubular member, means in said transducer carrier for changing the axial position of the second transducer relative to the first transducer, means connecting said adjustment mechanism to the means for changing the angular orientation of the first transducer to vary the angular orientation of the first when the adjustment mechanism is rotated, and means for connecting the adjustment mechanism to the second transducer for changing the axial position of that transducer relative to the first transducer when the adjustment mechanism is axially translated.

6. Ultrasonic inspection apparatus for insertion within a tubular member to ultrasonically inspect said member, comprising an ultrasonic transducer carrier adapted to be inserted within the tubular member, first and second coaxially aligned hollow shafts respectively secured to opposite sides of said transducer carrier, an inflatable sealing means carried on said first shaft and adapted to be inserted within the tubular member in nonsealing relationship therewith, a second fluidtight sealing means carried on said second shaft and being adapted to provide a fixed seal at one end of the tubular member when the inflatable sealing means and said transducer carrier are within said tubular member, means for inflating said inflatable sealing means to bring it into contact with the inner surface of the tubular member when the first hollow shaft and the transducer carrier are within said member, thereby to provide a fixed fluidtight seal at an axial location removed from said one end, said transducer carrier being disposed in spaced relationship from the inner surface of the tubular member when said two sealing means are in sealing engagement with the tubular member, means permitting said two shafts to be translated relative to the two fixed sealing means, means for filling the interior region of the tubular member bounded by the two sealing means with an ultrasonic energy-coupling fluid, and means for translating said two shafts and said transducer carrier as a rigid unit through the bounded region of said tubular member.

7. Ultrasonic inspection apparatus for insertion within the end of a tubular member having an upset end region to inspect said end region for flaws, the interior surface of said member being inclined to the central axis of a member in at least a portion of the upset end region, said apparatus comprising elongated shaft means adapted to be inserted within a tubular member at its upset end, ultrasonic inspection means carried on the shaft means intermediate the two ends thereof, expandable fluidtight sealing means carried on said shaft means on one side of the inspection apparatus, a second fluidtight sealing means carried on said shaft means on the side of the inspection apparatus opposite said expandable sealing means, said second fluidtight sealing means being adapted to provide a fixed seal at the upset end of the tubular member when the expandable sealing means and at least a portion of the shaft means are within the tubular member, means for expanding said expandable sealing means against the inside wall of the tubular member to provide a fixed fluidtight seal at a location axially spaced from said upset end, said shaft means being helically translatable through said two sealing means, means for filling the interior region of the tubular member bounded by said two sealing means with an ultrasonic energy-coupling fluid, and means for helically translating said shaft means and said ultrasonic inspection means through the interior of the upset end region of said tubular member.

8. The apparatus claimed in claim 7 wherein said ultrasonic inspection means includes first and second ultrasonic transducers disposed in spaced relationship with respect to each other, a first transducer mounting means for mounting the first transducer at a desired angular orientation relative to the inner surface to the member, means coupled to said mounting means and accessible at a location exterior to the sealed upset end of the tubular member for changing the angular orientation of said first transducer relative to the axis of said member, thereby to establish a desired angular orientation of the first transducer relative to the inner surface of the member irrespective of the inclination of the inner surface relative to the axis of the tubular member, second transducer mounting means for mounting said second transducer, means coupled to said second mounting means and accessible at a location external to the sealed upset end of the tubular member for translating said second mounting means and second transducer relative to the first transducer, thereby to position said second transducer to optimally receive ultrasonic energy transmitted by the first transducer and reflected from the inner surface of the tubular member.

9. The inspection apparatus claimed in claim 8 wherein
said elongated shaft means includes first and second hollow shafts,
said first hollow shaft extending from said ultrasonic inspection apparatus through said expandable sealing means and said second hollow shaft extending from the ultrasonic inspection apparatus through said second sealing means to the exterior of the sealed tubular member,
said means for changing the angular orientation of the first transducer and for translating said second mounting means including
mechanism extending through the interior of the second hollow shaft and coupled respectively to said first transducer-mounting means and said second transducer-mounting means,
means exterior to the sealed tubular member for rotating said mechanism to change the angular orientation of the first ultrasonic transducer, and
means for axially translating at least a portion of said mechanism to axially translate said second ultrasonic transducer relative to said first ultrasonic transducer.

10. The inspection apparatus claimed in claim 9 wherein
said expandable sealing means includes an inflatable member which may be inflated by a fluid under pressure to engage the inner surface of the tubular member to provide a fixed seal therein.

11. The inspection apparatus claimed in claim 10 and further including,
a first fluid passageway extending through said first and second hollow shafts,
fluid-coupling means communicating with said first passageway at a region exterior to the sealed tubular member,
means in said first hollow shaft providing a second fluid passageway to said inflatable sealing means, whereby fluid under pressure pumped into said fluid-coupling means passes through said first and second passageways to inflate the inflatable sealing means.

12. The inspection apparatus claimed in claim 9 wherein the means for axially translating said shaft means includes
motor-driven roller means engaging the outer surface of said second hollow shaft for imparting a helical motion of said second hollow shaft.

13. The method of ultrasonically inspecting a tubular member from the interior of said member with an inspection tool comprised of two spaced sealing means carried on shaft means which is translatable with respect to the sealing means, the first one of the sealing means being insertable furthest within the member and being expandable, said tool further including ultrasonic transmitting and receiving means carried on the shaft means between the two sealing means, said method comprising
inserting said tool within an end of a tubular member,
sealing the second sealing means to said end of the tubular member,
expanding the first sealing means from a position of nonsealing engagement with the inner surface of the member to a position of sealing engagement therewith,
flooding the interior region of the tubular member bounded by the two sealing means with an ultrasonic energy coupling fluid, and
translating said ultrasonic means through the bounded region of the tubular member.

14. The method claimed in claim 13 wherein the expandable sealing means is inflatable and wherein the step of expanding that sealing means includes
pumping a fluid under pressure into the inflatable sealing means to bring it into sealing engagement with the inner surface of the tubular member.

15. The method of ultrasonically inspecting a tubular member having first and second portions whose inner surfaces are inclined at different angles relative to the central axis of the tubular member, said method comprising
inserting within an end of a tubular member an ultrasonic inspection tool comprised of two spaced sealing means carried on shaft means which is translatable with respect to the sealing means, the first one of the sealing means being insertable furthest within the member and being expandable, said tool further including first and second ultrasonic transducers carried on the shaft means intermediate the sealing means, at least one of said transducers being changeable in angular orientation relative to the central axis of the tubular member and the two transducers being axially translatable relative to each other,
sealing the second sealing means to one end of the tubular member,
expanding the first sealing means to bring it from a position of nonsealing engagement with the inner surface of the tubular member to a position of sealing engagement therewith,
flooding the inner region of the tubular member bounded by the two sealing means with an ultrasonic energy-coupling fluid,
translating said transducers through the bounded region of the tubular member,
adjusting the angular orientation of said one of said transducers relative to the central axis of the tubular member, and
changing the axial location of said transducers relative to each other.

16. The method of ultrasonically inspecting a tubular member from the interior of said member with an inspection tool comprised of two spaced sealing means carried on shaft means which is helically translatable with respect to the sealing means, the first one of the sealing means being insertable furthest within the member and being inflatable, said tool further including first and second ultrasonic transducers carried on the shaft means between the two sealing means, said transducers being, respectively, changeable in angular orientation relative to the central axis of the tubular member and translatable relative to the other transducer, said method comprising,
inserting said tool within an end of a tubular member,
sealing the second sealing means to said end of the tubular member,
inflating the first sealing means to bring it into sealing engagement with the inner surface of the member,
flooding the interior region of the tubular member bounded by the two sealing means with an ultrasonic energy-coupling fluid, and
helically translating said shaft means and said transducers through the bounded region of the tubular member.

17. The method claimed in claim 16 and including the steps of
adjusting the angular orientation of the first transducer prior to its helical translation so that ultrasonic energy transmitted by the first transducer is incident on the inner surface of the member at a desired angle, and
adjusting the spacing of the second transducer relative to the first transducer so that ultrasonic energy transmitted by the first transducer and reflected from the inner surface of the tubular member is received by the second transducer.

18. The method claimed in claim 17 wherein the tubular member being inspected includes two regions whose inner surfaces are inclined at different angles to the central axis of the tubular member and wherein the claimed angular orientation of the first transducer was adjusted relative to the inner surface of a first one of said regions, and wherein the method includes the following steps which are performed after the transducers are translated through at least a portion of said bounded region, adjusting the angular orientation of the first transducer so that ultrasonic energy transmitted by that transducer is incident at a desired angle on the inner surface of the second one of said regions of the tubular member, and adjusting the spacing of the second transducer relative to the first transducer so that ultrasonic energy transmitted by the first transducer reflected from the inner surface of said second region of the tubular member is received by said second transducer.